3,575,872
SELENOCARBAZONATES AND THEIR USE AS
PHOTOCHROMIC MATERIALS
John Kazan, Jr., Somerville, N.J., assignor to American
Cyanamid Company, Stamford, Conn.
No Drawing. Filed Aug. 27, 1969, Ser. No. 853,506
Int. Cl. G02b 5/22
U.S. Cl. 252—300                                              12 Claims

ABSTRACT OF THE DISCLOSURE

Photochromic compounds are provided comprising metal complexes of 1,5-diarylselenocarbazones having the formulae:

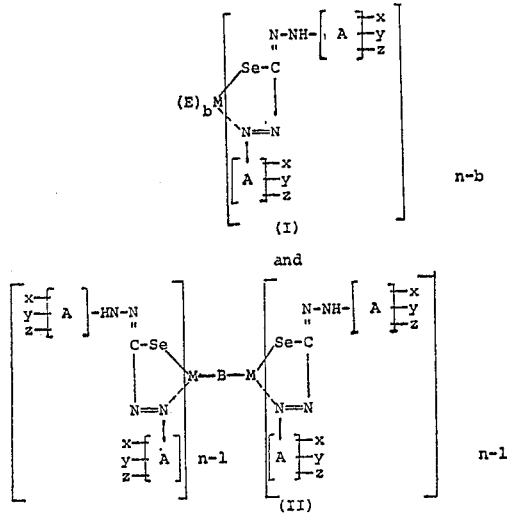

wherein M is a metal selected from the group consisting of Hg, Zn, Pd and Bi; E is a halogen or R which is a radical selected from the group consisting of alkyl up to 18 carbons, alkenyl of 2–10 carbons, aralkyl and aryl; $n$ is the valence of the metal M; $b$ is an integer from 0 to 2 such that $n-b$ is an integer greater than 0; A is an aryl radical containing from 6 to about 12 carbon atoms; $x$, $y$, and $z$ are individually selected from the group consisting of hydrogen, lower alkyl, hydroxy, lower alkoxy, halo, nitro, amino, di-lower alkylamino or phenylazo; and B is alkylene of 2–10 carbon atoms or arylene of 6–12 carbon atoms.

Also, the diarylselenocarbazide and diarylselenocarbazone precursors of said metal complexes are provided.

---

This invention relates to a new class of photochromic compounds, 1,5-diarylselenocarbazonates. More particularly, it relates to metal complexes of 1,5-diarylselenocarbazones which complexes are capable of changing color in response to variations in the intensity of incident visible light.

Photochromic compounds have heretofor been applied to or incorporated in various substrates to render said materials photochromic. For example, polymers containing a measurable quantity of a photochromic compound change color upon exposure to visible radiation. The color change is believed to follow from the transformation of the photochromic compound from a stable form to a meta-stable form. When the source of radiation is removed, the compound returns from the meta-stable to the stable form and reverts to its original color. Materials of this type are useful in obtaining unique camouflage, design, and novelty effects. Many photochromic compositions heretofor available have met with limited acceptance because of their relatively slow rates of conversion by light into their meta-stable form (highly colored forms) and/or their slow rate of return to their stable (original color) form.

Accordingly, it is an object of this invention to provide a new class of photochromic compounds. It is another object to provide novel precursors for said photochromic compounds. It is yet another object of this invention to provide photochromic compounds exhibiting rapid forward rates to their meta-stable form and rapid return rates to their stable form. Other objects will become apparent from the ensuing description.

The present invention provides metal complexes of 1,5-diarylselenocarbazones of the formulae:

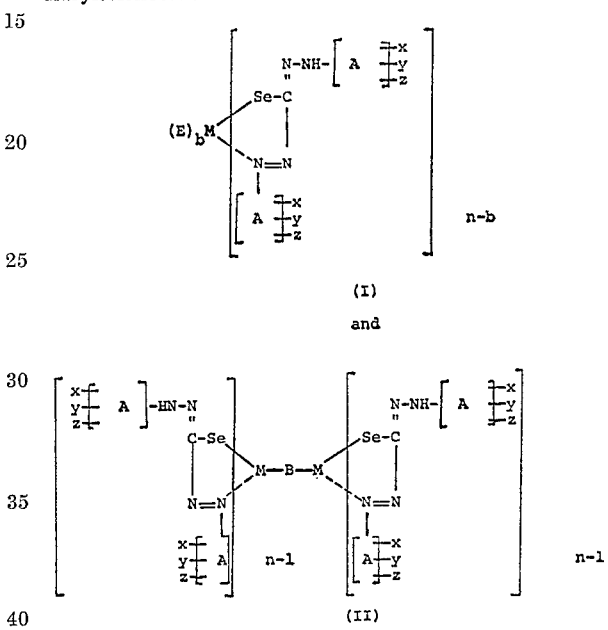

In the formulae, M is a metal selected from the group consisting of Hg, Zn, Pd and Bi, E is a halogen such as fluorine, chlorine, bromine and iodine or R which is intended to represent an alkyl radical of up to eighteen carbon atoms (including cycloalkyl of five or six carbon atoms), an alkenyl radical of 2–10 carbon atoms, an aralkyl radical, especially monocyclic or bicyclic ar(lower alkyl) such as benzyl, naphthylethyl or phenethyl, an aryl radical such as carbocyclic aromatic radicals (phenyl, biphenyl, naphthyl) or heterocyclic aromatic radicals having five or six ring members such as furyl and pyridyl, $n$ is the valence of the metal and generally ranges from 1 to about 3, $b$ is an integer from 0 to 2 such that $n-b$ is an integer greater than 0; the symbol "A" is intended to represent an aryl radical containing from 6 to about 12 carbon atoms such as phenyl or naphthyl. The compounds of Formulae I and II may bear inert substituents and still be within the scope of the present invention. For example, R can be substituted by hydroxy, lower alkoxy, di-lower alkylamino, carbamoyl, halo, trifluoromethyl, nitro, carboxy, carb-lower alkoxy or lower alkanoyl. X, $y$ and $z$ are intended to represent either hydrogen, a lower alkyl radical, hydroxy, a lower alkoxy radical, a halo radical, a nitro radical, an amino radical, a di-lower alkylamino radical or a phenylazo radical. The symbol B is intended to represent a divalent organic linkage such as an alkylene radical of 2–10 carbon atoms or a monocyclic or bicyclic arylene radical of 6–12 carbon atoms such as phenylene or naphthylene. The radical B can likewise bear substituents such as those optionally found on radical R.

The metal complexes 1,5-diarylselenocarbazones of Formulae I and II above exhibit photochromic properties, i.e., when incorporated into or applied onto a suitable substrate and irradiated with visible light, the color of the compound changes toward the longer wave length regions of the spectrum, i.e., toward the violet end of the spectrum. The color reverts to the original color when the irradiation source is removed. The compounds of the present invention are rapidly and efficiently converted by light into their meta-stable forms and exhibit extremely rapid return rates to their stable form.

The metal complexes of Formula I and Formula II can be prepared by several different routes. By one method, a diarylselenocarbazone (III) wherein A, $x$, $y$ and $z$ are as defined above is reacted with a metallic salt wherein E, M and $b$ are as defined above in the presence of a buffer material. This can be illustrated by the following equation 1:

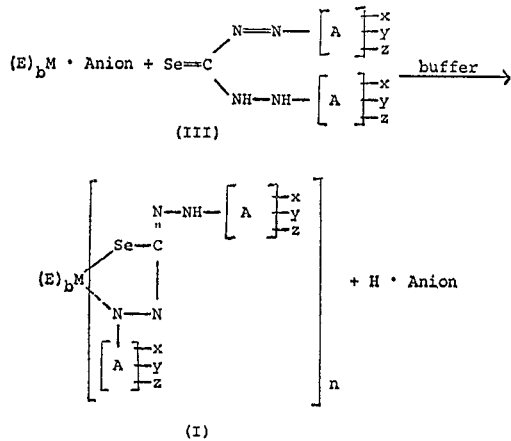

This reaction proceeds at about 10° C. to about 40° C. to give the product in good yield. As buffering materials, there may be used sodium carbonate, sodium bicarbonate, sodium acetate, sodium biphosphate and the like. Although it is not necessary, it is considered preferable to employ a reaction diluent such as benzene, chloroform, methylene chloride, tetrahydrofuran and the like. A two-phase solvent system is usually used in the reaction. To a substantially equal volume mixture of one of the above solvents and water, is added the buffer, diarylselenocarbazone and the metallic salt. The mixture is stirred for approximately a few hours at room temperature. The organic layer is separated, washed with water and a base such as ammonium hydroxide and dried. After the solvent is removed, the residue can be purified by conventional procedures.

The metallic complexes of the present invention can be conveniently converted into other metal complexes of 1,5-diarylselenocarbazones by reacting the initial metal complex with a metal salt corresponding to the desired compound.

These compounds can also be prepared by dissolving the metallic salt in refluxing alcohol such as ethanol or methanol followed by the addition of an equimolar quantity of the diaryl selenocarbazone whereupon the complex precipitates out. The compound can then be isolated by filtration and purified by conventional methods. This procedure is less time-consuming than the previous method, but it is not practical in the preparation of acid-sensitive metallic complexes since acid is formed in the reaction. This procedure can be adjusted to produce the complexes of Formula II by using two moles of the diaryl selenocarbazone with one mole of a metallic salt such as a dimercury salt with a corresponding increase in the quantity of buffer used.

The metallic bis- or tris(diaryl selenocarbazones), i.e., the compounds of Formula I wherein $n$ is 2 or 3, can be easily prepared by the reaction illustrated in Equation 1 employing metallic salts wherein the valence of the metal is 2 or 3 such as zinc salts or bismuth salts. In the case of metals such as mercury, inorganic mercuric salts, e.g., mercuric chloride or mercuric nitrate, can be employed with two moles of the diaryl selenocarbazone instead of one. Otherwise, reaction conditions are the same.

The 1,5-diarylselenocarbazones (III) precursors employed in the preparation of the metallic complexes of the present invention are also novel. They can readily be prepared by heating the corresponding 2-arylhydrazonium 3-aryl-diselenocarbazates (IV) to form the corresponding diaryl selenocarbazides (V) which are also novel and which can be readily oxidized to the diaryl selenocarbazones (III). This can be illustrated by the following Equation 2:

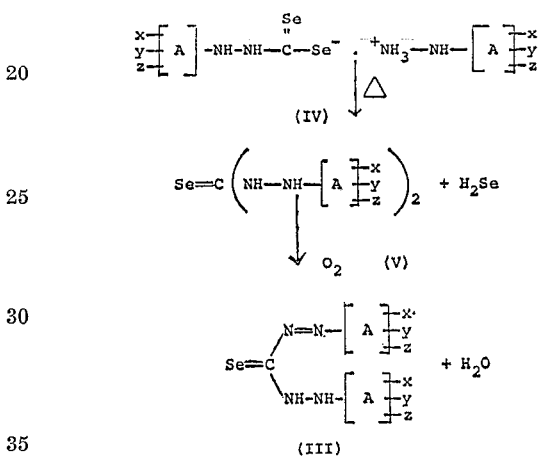

The 2-arylhydrazonium 3-aryldiselenocarbazates (IV) can be prepared by reacting the corresponding arylhydrazine (VI) with carbon diselenide. This can be illustrated by the following Equation 3:

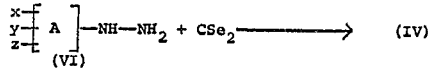

Representative arylhydrazines (VI) which can be employed include phenylhydrazine, p-tolylhydrazine, 2,4-xylylhydrazine, 1-naphthylhydrazine, 2-naphthylhydrazine, p-nitrophenylhydrazine, m-methoxyphenylhydrazine, p-chlorophenylhydrazine, 1 - bromo-2-naphthylhydrazine, p-hydrazinobenzoic acid, p-hydrazino-N,N-dimethylbenzamide, 4'-hydrazinoacetanilide and the like.

The arylhydrazine and carbon diselenide can be reacted in stoichiometric amounts in a suitable inert solvent such as dichloromethane or absolute ethanol. The reaction temperature can range from about 0° to about 30° C. The 2-arylhydrazonium 3-aryldiselenocarbazates (IV) can be isolated by conventional procedures.

The conversion of the 2-arylhydrazonium 3-aryldiselenocarbazate (IV) to the corresponding selenocarbazide (V) can be conveniently effected by heating the hydrazonium salt. This can be done by refluxing a solution of the hydrazonium salt in a suitable inert solvent, such as ethyl acetate or carbon tetrachloride, until there is no further evolution of hydrogen selenide. Purification of the crude product is unnecessary before carrying out the conversion of said selenocarbazide to the 1,5-diarylselenocarbazone (III). It is considered preferable, however, to remove the solvent before proceeding with the conversion to the 1,5-diarylselenocarbazone.

The diarylselenocarbazide (V) can be converted to the 1,5-diarylselenocarbazone (III) by oxidation with atmospheric oxygen in an alkaline medium. The oxidation can be conveniently accomplished by adding an alkali, such as for example potassium hydroxide, sodium hydroxide, lithium hydroxide and the like, and an inert solvent, such as ethanol, methanol and the like, to the selenocarbazide, followed by agitation in the presence of atmospheric oxygen at a low temperature, e.g., —50° to about —10° C. The resulting 1,5-diarylselenocarbazone can be isolated by adding the reaction mixture to an aqueous mineral acid to precipitate the product. The product can then be recovered by filtering or other conventional techniques.

The reaction between a 1,5-diarylselenocarbazone (III) and a metal salt can be conducted near or in the presence of an inert diluent. It is considered preferable however to use an inert diluent such as tetrahydrofuran, benzene, chloroform, methylene chloride and the like. The reaction proceeds easily at temperatures ranging from about 10° to about 40° C. to give the product in good yield. Conventional recovery procedures can be employed to isolate and purify the products.

Suitable metal salts which can be employed to form the metal complexes of the present invention include the inorganic and organic salts of mercury, zinc, palladium and bismuth. For purposes of illustration only, the suitable mercury salts are described herein below. It should be readily apparent, however, that the corresponding salts of zinc, palladium and bismuth can be employed with equal facility.

Suitable mercuric salts for use in preparing compounds of Formulae I and II are the following:

(A) Inorganic mercuric salts such as mercuric halides, nitrate, sulfate, acetate, etc.

(B) Organic mercuric salts, such as the alkyl mercuric salts wherein the alkyl group contains from 1 to about 18 carbon atoms such as methylmercuric iodide, ethylmercuric bromide, octylmercuric chloride and octadecylmercuric bromide. Other alkyl mercuric salts which have inert substituents on the organo moiety and are useful herein are 2-hydroxyethylmercuric acetate, 2-ethoxyethylmercuric acetate, 4-ethoxybutylmercuric iodide and pentafluoroethylmercuric iodide, etc. Cycloalkyl compounds wherein the cycloalkyl group contains from 3 to about 8 carbon atoms include cyclopentylmercuric chloride. cyclohexylmercuric bromide, 2-hydroxycyclohexylmercuric chloride, 2-ethoxycyclohexylmercuric chloride, etc. Alkenyl compounds of from 2 to about 18 carbon atoms include vinyl mercuric chloride, allylmercuric bromide, etc. Aralkyl compounds wherein the aralkyl group includes monocyclic and bicyclic ar(lower alkyl) compounds such as phenethyl mercuric chloride, naphthylethyl mercuric acetate, benzylmercuric acetate, etc. Carbocyclic aryl compounds including phenylmercuric acetate, p-tolylmercuric bromide, xylylmercuric acetate, 2-naphthylmercuric chloride, 2-hydroxyphenylmercuric acetate, 2,4-dihydroxyphenylmercuric acetate, 5 - hydroxy-o-tolylmercuric acetate, p-methoxyphenylmercuric chloride, 4 - fluoro-2-hydroxyphenylmercuric acetate, p-chlorophenylmercuric chloride, p-nitrophenylmercuric chloride, o-carbamoylphenylmercuric acetate, p-dimethylaminophenylmercuric acetate, etc. Heterocyclic aromatic compounds include 3-furylmercuric chloride, 2,5-dimethyl-3-furylmercuric chloride, 3-pyridylmercuric borate, etc.

(C) Bis-mercuric salts of the formula:

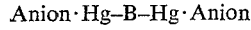

Anion·Hg–B–Hg·Anion which may be used to prepare the complexes of Formula II include tetramethylenebis(mercuric chloride), pentamethylenebis(mercuric chloride), 1 - methoxyethylenebis-(mercuric chloride), 1-methoxy-4-methyl-1,2-cyclohexylenebis(mercuric chloride), m-phenylenebis(mercuric acetate), 2,2'-biphenylenebis(mercuric chloride), 1,3-naphthylenebis(mercuric chloride), etc.

In general, it should be noted that the anionic portion of the metallic salt is completely non-determinative of the photochromic properties of the final metal complex useful in the present invention. All that is required is that the metallic salt, whatever the anion, be soluble in a reaction medium from which compounds of Formulae I and II are obtained.

When compounds of Formula I or II are applied to or incorporated in various materials, the materials are rendered photochromic. For example, polymers containing a measurable quantity of a compound of Formula I or II change color upon exposure to visible radiation (i.e., radiation having a wavelength in the range of 0.4 to 0.7 micron). The color change is believed to follow from the transformation of the above compounds from a stable form (the less colored form) to a metastable form. When the source of radiation is removed, the compound returns from the metastable to the stable form.

The amount of the metal complex which is considered useful for the practice of this invention depends mainly upon the desired effect and the thickness of the substrate. In general, between about 0.001 percent and about 10 weight percent has been found satisfactory. It is considered preferable however to employ between about 0.005 percent and 5 percent of the complex based on the weight of the substrate. In view of the many fields of application and possible material which can be employed, however, special circumstances may require that more or less of the photochromic compounds be employed.

It is not only necessary for use in the present invention that photochromic compositions be light stable and exhibit a color change, but it is also required that the color differential (relative luminosity) be sufficiently great to be visible to the eye. The time required for the color change to take place is also an important factor. The forward change (to the metastable form) and the return change, must be sufficiently rapid to reflect periodically varying light conditions. The compounds used in this invention are satisfactory in these respects as will be seen from the examples.

Either transparent or reflective substrates can be used in the present invention, depending on whether a photochromic light filter or a photochromic reflective surface is desired. The photochromic compound can be combined with the substrate with which it is to be used, by conventional blending, coating, dyeing, milling or molding methods for the given substrate. The choice of application technique is not an aspect of the present invention and will depend on the nature of the substrate, available equipment, and the desired end-use for the product. Among the many materials to which the photochromic compounds can be applied are such natural polymeric materials as cotton, silk, w$_\Omega$ol, paper and wood. In the case of cotton, silk wool paper and the like a dyeing method may be used. In the case of wood the photochromic compound may be suspended in a conventional paint or other coating vehicle, along with pigments and applied by spraying or brushing techniques.

The photochromic compounds useful according to this invention may be applied to synthetic polymeric materials which may be either solid or liquid, and either transparent, translucent or opaque. Among the many usable polymeric compositions are cellulose esters such as cellulose acetate, cellulose butyrate, cellulose nitrate, cellulose acetate butyrate, cellulose propionate, cellulose triacetate, polymeric esters of acrylic acid and methmethacrylic acid [e.g., poly(methyl methacrylate)], polyolefins, vinyl polymers such as polystyrenes, poly(vinyl halides) poly(vinyl chloride-vinyl acetate) copolymers, polycarbonates, polyacetals, poly(vinyl butyral) poly (vinyl acetate) cellulose ethers such as cyanoethylated cellulose and carbamylethylated cellulose, melamine resins, polyacrylonitrile, polyester resins, etc.

Along with the photochromic compounds of Formula I and Formula II there can be added to the substrate other materials such as fillers, antioxidants, light stabilizers, ultraviolet absorbers, pigments, dyestuffs as well as other additives without adverse effect to the photochromic properties of the compounds. In many instances, the inclusion of a pigment or dyestuff provides unique

EXAMPLE 1

Preparation of 2-phenylhydrazonium 3-phenyl-diselenocarbazate

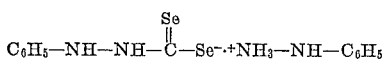

A solution of 3.4 g. carbon diselenide in 90 g. dichlormethane is slowly added to a solution of 11.0 g. phenylhydrazine in 350 g. dichloromethane. After the mixture is stirred for an additional 1–2 hours, the resulting crystalline precipitate is separated by filtration and washed with dichloromethane. The product melts at about 67° C. with decomposition.

Calc. for $C_{13}H_{16}N_4Se_2$ (percent): C, 40.4; H, 4.17; N, 14.5; Se, 40.8. Found (percent): C 40.1; H, 4.15; N, 14.8; Se, 40.0.

When the procedure is repeated substituting for the phenylhydrazine equivalent amounts of p-tolylhydrazine 2-naphthylhydrazine p-nitrophenylhydrazine, p-fluorophenylhydrazine or 4-hydrazinoacetanilide, the products obtained are 2-p-tolylhydrazonium 3-p-tolyldiselenocarbazate, 2-(2-naphthyl)hydrazonium 3-(2-naphthyldiselenocarbazate), 2-p-nitrophenylhydrazonium 3-p-nitrophenyldiselenocarbazate, 2-p-fluorophenylhydrazonium 3-p-fluorophenyldiselenocarbazate, and 2-p-acetamidophenylhydrazonium 3-p-acetamidophenyldiselenocarbazate, respectively.

EXAMPLE 2

Preparation of 1,5-diphenyleselenocarbazone

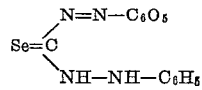

A solution of 3.0 g. 2-phenylhydrazonium 3-phenyldiselenocarbazate (product of Example 1) in 150 ml. ethyl acetate is refluxed until the evolution of hydrogen selenide has ceased. The solution is cooled and filtered, and the solvent is removed by evaporation. The resulting brown oil is stirred for about one hour at −10° C. with 50 ml. 10% solution of potassium hydroxide in methanol, and the red mixture is poured into 200 ml. 2 N sulfuric acid, and saturated with sodium chloride at −5° C. The precipitate is separated by filtration, washed with water and dried at room temperature. The material is extracted in a Soxhlet apparatus with pentane. The product is obtained from the pentane as a brown solid melting at 65–70° C. with decomposition.

Calc. for $C_{13}H_{12}N_4Se$ (percent): C, 51.5; H, 3.99; N, 18.5; Se, 26.0. Found (percent): C, 51.5; H, 4.10; N, 17.4; Se, 26.2.

When the above procedure is repeated substituting for the 2 - phenylhydrazonium 3 - phenyldiselenocarbazate equivalent amounts of 2-p-tolylhydrazonium 3-p-tolylselenocarbazate 2-(2-naphthylhydrazonium) 3-(2-naphthyl)diselenocarbazate, 2-p-nitrophenylhydrazonium 3-p-nitrophenyldiselenocarbazate, 2-p-fluorophenylhydrazonium 3-p-fluorophenyldiselenocarbazate or 2-p-acetamidophenylhydrazonium 3-p-acetamidophenyldiselenocarbazate, the products obtained are 1,5-di-p-tolylselenocarbazone, 1,5-di(2-naphthyl)selenocarbazone, 1,5-di-p-nitrophenylselenocarbazone 1,5-di-p-fluorophenylselenocarbazone and 1,5-di-p-acetamidophenylselenocarbazone, respectively.

EXAMPLE 3

Preparation of chloromercury 1,5-diphenyl-selenocarbazonate

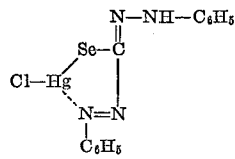

A solution of 0.50 g. (0.00184 mole) mercuric chloride in 10 ml. tetrahydrofuran is added to 0.50 g. (0.00154 mole) 1,5-diphenylselenocarbazone (product of Example 2). The solution is poured into 200 ml. water, and the precipitate thus formed is separated by filtration. The product, after purification by chromatography on silica gel using methylcyclohexane and benzene as the eluents with a final crystallization from ethyl acetate, appears as a maroon crystalline solid, melting at 187–189° C. with decomposition.

Calc. for $C_{13}H_{11}N_4SeHgCl$ (percent): C, 29.0; H, 2.06; N, 10.0; Se, 14.7; Hg, 37.3; Cl, 6.59. Found (percent): C, 29.1; H, 2.08; N, 9.77; Se, 14.6; Hg, 37.7; Cl, 6.80.

When the procedure is repeated substituting for the 1,5-diphenylselenocarbazone equivalent amounts of 1,5 - di - p - tolylselenocarbazone, 1,5 - di(2 - naphthyl) selenocarbazone, 1,5-di-p-nitrophenylselenocarbazone, 1,5-di-p-fluorophenylselenocarbazone or 1,5-di-p-acetamidodiphenylselenocarbazone, the products obtained are chloromercury 1,5-di-p-tolylselenocarbazonate, chloromercury 1,5-di-p-fluorophenylselenocarbazone and chloromercury 1,5-di-p-acetamidophenylselenocarbazonate, respectively.

EXAMPLE 4

Preparation of mercury bis(1,5-diphenylselenocarbazonate)

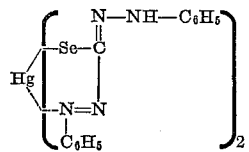

A solution of 0.232 g. (0.00085 mole) mercuric chloride in 10 ml. tetrahydrofuran is added to a solution of 0.50 g. (0.00165 mole) 1,5 - diphenylselenocarbazone (product of Example 2) in 20 ml. of tetrahydrofuran at 20–25° C. After about five minutes, 5 g. of water and about 0.60 g. sodium bicarbonate are added, and the mixture is poured into 300 g. water. Extraction with dichloromethane and evaporation of the solvent yields a red oil, which can be purified by chromatography on silica gel using methyl cyclohexane and benzene as the eluents. The product is separated from the benzene and, after crystallization from benzene, hexane, appears as maroon needles melting at 196–196.5° C. with decomposition.

Calc. for $C_{26}H_{22}N_8Se_2Hg$ (percent): C, 38.8, H, 2.76; N, 13.9; Se, 19.6; Hg, 24.9. Found (percent): C, 38.8; H, 2.48; N, 13.8; Se, 19.2; Hg, 25.3.

When the procedure is repeated substituting for the 1,5-diphenylselenocarbazone, equivalent amounts of 1,5-di-p-tolylselenocarbazone, 1,5 - di(2 - naphthyl)selenocarbazone, 1,5 - di - p - nitrophenylselenocarbazone, 1,5-di-p-fluorophenylselenocarbazone or 1,5 - di - p - acetamidophenylselenocarbazone, the products obtained are mercury bis(1,5 - di - p-tolylselenocarbazonate), mercury bis-[1,5 - di(2 - naphthyl)selenocarbazonate], mercury bis - (1,5 - difluorophenylselenocarbazonate) and mercury bis(1,5 - di - p - acetamidophenylselenocarbazonate), respectively.

EXAMPLE 5

Preparation of zinc bis(1,5-diphenylselenocarbazonate)

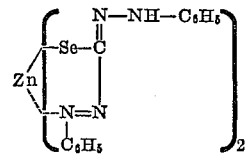

The general procedure of Example 4 is followed using 0.181 g. (0.000825 mole) zinc acetate and 0.50 g. (0.00165 mole) 1,5-diphenylselenocarbazone (product of Example 2). The product, after purification by chromatography on silica gel using benzene as the eluent and recrystallization from tetrahydrofuranhexane, appears as a green solid melting at 241–242° C. with decomposition.

Calc. for $C_{26}H_{22}N_8Se_2Zn$ (percent): C, 46.6; H, 3.31; N, 16.7; Se, 23.6; Zn, 9.76. Found (percent): C, 46.3; H, 3.13; N, 16.6; Se, 23.4; Zn, 9.13.

EXAMPLE 6

Preparation of methylmercury 1,5 - diphenylselenocarbazonate from the corresponding zinc complex

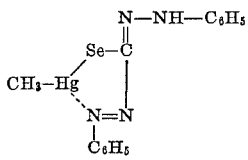

A mixture of 1.45 g. (0.00217 mole) zinc bis(1,5-diphenylselenocarbazonate) (product of Example 5), 1.09 g. (0.00434 mole) methylmercuric chloride and 100 ml. tetrahydrofuran is stirred at 20–25° C. for about 15 min. and added to 100 ml. water. The resulting mixture is extracted with methylene chloride. The product, isolated by evaporation of the methylene chloride and purified by crystallization from isopropanol, is an orange-red crystalline solid melting at 147.5–148.5° C.

Calc. for $C_{14}H_{14}N_4SeHg$ (percent): C, 32.5; H, 2.72; N, 10.8; Se, 15.3; Hg, 38.7. Found (percent): C, 32.2; H, 2.70; N, 10.5; Se, 14.8; Hg, 39.1.

EXAMPLE 7

Preparation of palladium bis(1,5-diphenylselenocarbazonate) from the corresponding zinc complex

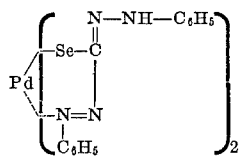

A solution of 0.85 g. (0.00104 mole) palladium chloride in 10 ml. 15 N ammonium hydroxide is added to a solution of 0.690 g. (0.00103 mole) zinc bis (1,5-diphenylselenocarbazonate) (Product of Example 5) in about 90 ml. tetrahydrofuran. The resulting solution is poured into 600 ml. water at 5° C., and the mixture is neutralized by adding dilute sulfuric acid. The precipitate is separated by filtration and purified by dissolving in tetrahydrofuran and reprecipitating with methanol. The product is a dark green crystalline solid melting at about 271° C., with decomposition.

EXAMPLE 8

Preparation of bismuth tris (1,5-diphenylselenocarbozonate) from the corresponding zinc complex

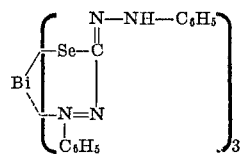

Bismuth trichloride (0.202 g., 0.0064 mole) is added to a solution of 0.635 g. (0.0095 mole) zinc bis(1,5-diphenylselenocarbazonate) (product of Example 5) in 40 ml. tetrahydrofuran. After about 15 min., the solution is added to 100 ml. of water at 5° C. and the precipitate is separated by filtration and the precipitate is separated by filtration and recrystallized from butanol. The product is a brown crystalline solid which decomposes at about 190–191° C.

Calc. for $C_{39}H_{33}N_{12}Se_3Bi$ (percent): C, 42.0; H, 2.98; N, 15.1; Se, 21.2; Bi, 18.7. Found (percent): C, 41.7; H, 3.31; N, 15.2; Se, 20.3; Bi, 18.9.

EXAMPLE 9

The photochromism of the products of Examples 3–6 was evaluated at room temperature using toluene as the solvent. Spectra of the unirradiated and irradiated solutions were obtained on a Cary 14 Recording Spectrophotometer using 1 cm. cells. For irradiated spectra, the near infrared recording method of the Cary 14 was used in which the full intensity of the 108-watt CPR projection lamp is filtered through a KG–3 filter and directed onto the sample.

The molar absorptivity at wavelength of maximum absorption is an expression of the degree of absorption and is calculated using the following relationship:

$$E = \frac{M}{bc} \log \frac{To}{T}$$

E is the molar absorptivity.

M is the molecular weight of the solute.

b is the thickness of the spectrophotometer cell in cm.

c is the concentration in grams per liter.

T is the transmittance of light passing through the solution.

To is the transmittance of light passing through the solvent in the same cell.

The larger the value of E, the greater the absorption.

TABLE I

| Product of Example | Unirradiated | | | | | |
|---|---|---|---|---|---|---|
| | Color | λMax., nm. | E | Color | λMax., nm. | E |
| 3 | Orange | 479 | 21,400 | Blue | 597 | 11,700 |
| 4 | do | 483 | 50,400 | do | 600 | 24,100 |
| 5 | Red | 530 | 71,200 | do | 700 | 30,000 |
| 6 | Orange | 470 | 28,500 | do | 600 | 13,500 |

EXAMPLE 10

The precent conversion of the products of Examples 3 and 4 to the meta-stable form when irradiated is shown in Table II.

The thermal-return half-life of each photochromic compound is measured by exposing the sample to the near-infrared source of the Cary Spectrophotometer in order to convert to the meta-stable form of the compound, and monitoring the absorbance at the wavelength of maximum absorbance as a function of time, using only the monochromatic light beam ordinarily used in the Cary instrument for measuring spectra in the visible region.

For comparative purposes, data for metal complexes of thiocarbazones, known photochromic compounds, are also shown in Table II.

TABLE II

| Product of Example | Percent conversion | Thermal return half-lift, sec. |
|---|---|---|
| 3 | 98 | 18 |
| 4 | 91 | 55 |
| (1) | 98 | 95 |
| (2) | 76 | 135 |

[1] Chloromercury 1,5-diphenylthiocarbazonate.
[2] Mercury bis(1,5-diphenylthiocarbazonate).

What is claimed is:

1. A photochromic complex of the formulae:

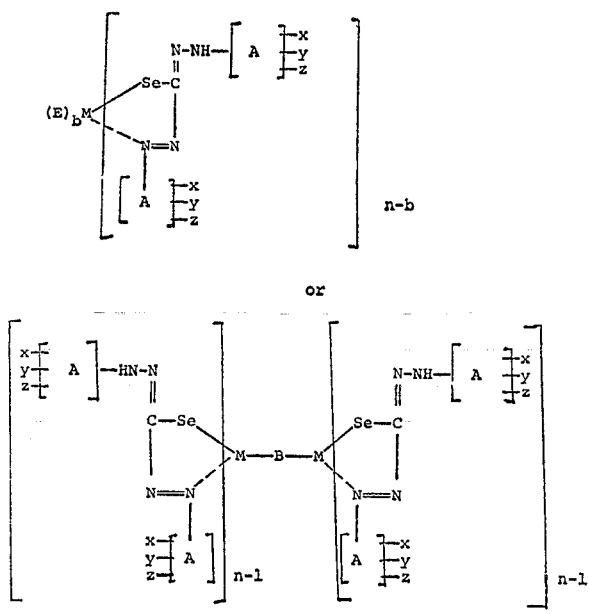

wherein M is a metal selected from the group consisting of Hg, Zn, Pd and Bi; E is a halogen or R which is a radical selected from the group consisting of alkyl up to 18 carbons, alkenyl of 2–10 carbons, aralkyl and aryl; $n$ is the valence of the metal M; $b$ is an integer from 0 to 2 such that $n-b$ is an integer greater than 0; A is an aryl radical containing from 6 to about 12 carbon atoms; $x, y,$ and $z$ are individually selected from the group consisting of hydrogen, lower alkyl, hydroxy, lower alkoxy, halo, nitro, amino, di-lower alkylamino or phenylazo; and B is alkylene of 2–10 carbon atoms or arylene of 6–12 carbon atoms.

2. A photochromic complex of claim 1 wherein M is mercury.

3. The photochromic complex of claim 2 which is chloromercury 1,5-diphenylselenocarbazonate.

4. The photochromic complex of claim 2 which is mercury bis(1,5-diphenylselenocarbazonate).

5. The photochromic complex of claim 2 which is methylmercury 1,5-diphenylselenocarbazonate.

6. A photochromic complex of claim 1 wherein M is zinc.

7. The photochromic complex of claim 6 which is zinc bis(1,5-diphenylselenocarbazonate).

8. A photochromic complex of claim 1 wherein M is palladium.

9. The photochromic complex of claim 8 which is palladium bis(1,5-diphenylselenocarbazonate).

10. A photochromic complex of claim 1 wherein M is bismuth.

11. The photochromic complex of claim 10 which is bismuth tris(1,5-diphenylselenocarbazonate).

12. A photochromic polymeric composition comprising:
(a) a polymer selected from the group consisting of cellulose esters, cellulose ethers, polymeric esters of acrylic acid or methacrylic acid, polyolefins, vinyl polymers, polycarbonates, polyacetates, melamine resins, and polyesters; and
(b) between about 0.001 and about 10 percent by weight of a photochromic complex of claim 1.

References Cited
UNITED STATES PATENTS 3,359,254 12/1967 Kagan _____ 260—149
3,361,706 1/1968 Meriweather et al. ____ 260—39

GEORGE F. LESMES, Primary Examiner
J. P. BRAMMER, Assistant Examiner

U.S. Cl. X.R.
260—144, 193, 551

UNITED STATES PATENT OFFICE
CERTIFICATE OF CORRECTION

Patent No. 3,575,872          Dated April 20, 1971

Inventor(s) John Kazan Jr.

It is certified that error appears in the above-identified patent and that said Letters Patent are hereby corrected as shown below:

Column 7, line 32, "$N=N-C_6O_6$" should read --$N=N-C_6H_5$--.

Column 8, line 20, after the expression "1,5-di-p-tolylselenocarbazonate," insert --chloromercury 1,5-di(2-naphthyl)selenocarbazonate, chloromercury 1,5-di-p-nitrophenylselenocarbazonate--.

Column 10, line 45, Column E, "30,000" should read --30,300--.

Column 10, line 69, "Thermal-return half-lift, sec." should read --Thermal-return half-life, sec.--.

Signed and sealed this 24th day of August 1971.

(SEAL)
Attest:

EDWARD M. FLETCHER, JR.      WILLIAM E. SCHUYLER, JR.
Attesting Officer               Commissioner of Patents